ns Patent [19]

Hunt

[11] 3,842,675
[45] Oct. 22, 1974

[54] THERMOMETER
[75] Inventor: George D. Hunt, Springfield, Ohio
[73] Assignee: The Ohio Thermometer Co., Springfield, Ohio
[22] Filed: Dec. 26, 1972
[21] Appl. No.: 318,366

[52] U.S. Cl. .............................................. 73/363.9
[51] Int. Cl. ............................................ G01k 5/64
[58] Field of Search .................................. 73/363.9

[56] References Cited
UNITED STATES PATENTS
| | | | |
|---|---|---|---|
| 1,933,801 | 11/1933 | Hart | 73/363.9 |
| 2,266,277 | 12/1941 | Seegers | 73/363.9 |
| 2,718,778 | 9/1955 | Kock | 73/363.9 |

FOREIGN PATENTS OR APPLICATIONS
| | | | |
|---|---|---|---|
| 277,906 | 9/1927 | Great Britain | 73/363.9 |

Primary Examiner—Richard C. Queisser
Assistant Examiner—Denis E. Corr
Attorney, Agent, or Firm—Jerome P. Bloom

[57] ABSTRACT

A plug-in thermometer comprising a rotatable and axially shiftable shaft affixed at one of its ends to a balanced circulator indicator drum having a temperature scale marked about its periphery. The drum and shaft are enclosed in a housing having an enlarged portion for the drum and an elongated portion for the shaft. Means are provided in association with the enlarged housing portion whereby the indicator drum temperature scale may be viewed and a temperature reading made with respect to a reference line on the enlarged housing portion. A helical bimetal element is located in the elongated housing portion and surrounds the shaft therein. One end of the bimetal element is affixed to the elongated housing portion and the other end to the shaft. The thermometer is calibrated such that the temperature of the medium surrounding the elongated housing portion will, through the agency of the bimetal element, result in rotation of the shaft and drum until the indicia on the drum scale corresponding to the temperature of the medium is in alignment with the reference line.

5 Claims, 11 Drawing Figures

PATENTED OCT 22 1974 3,842,675

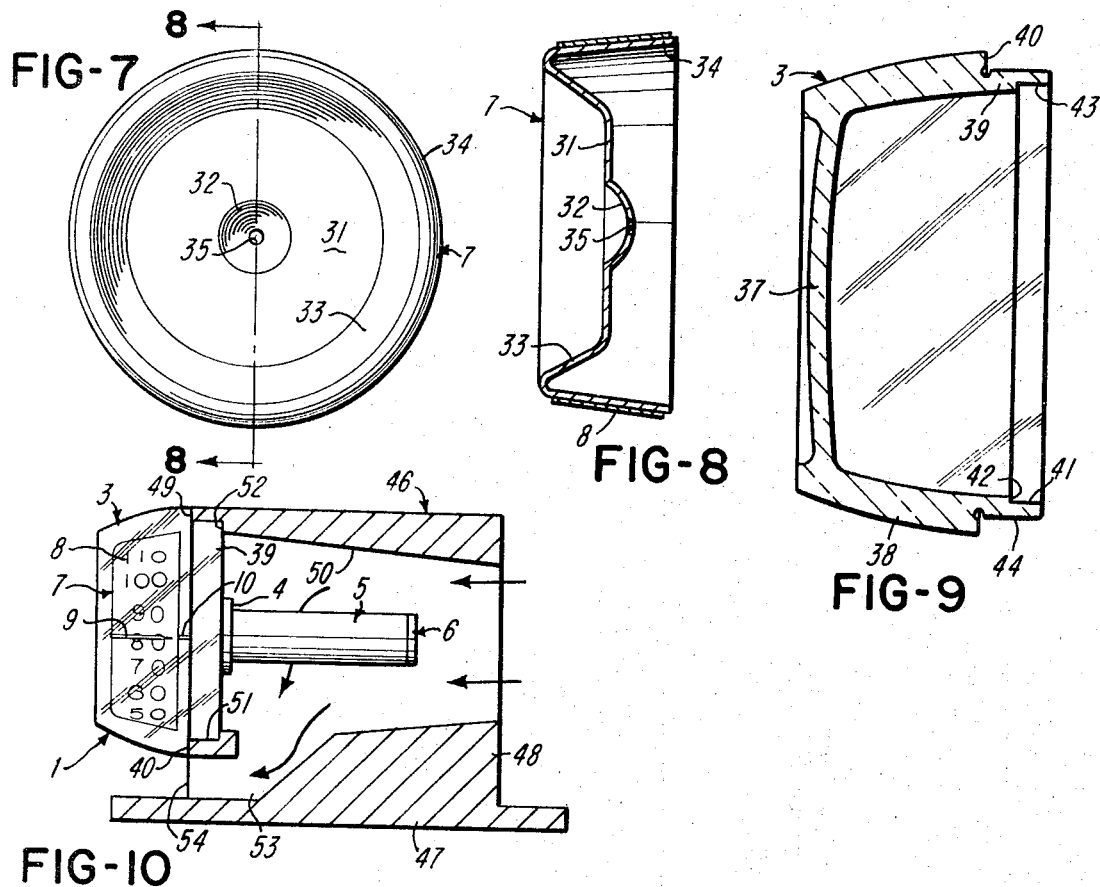
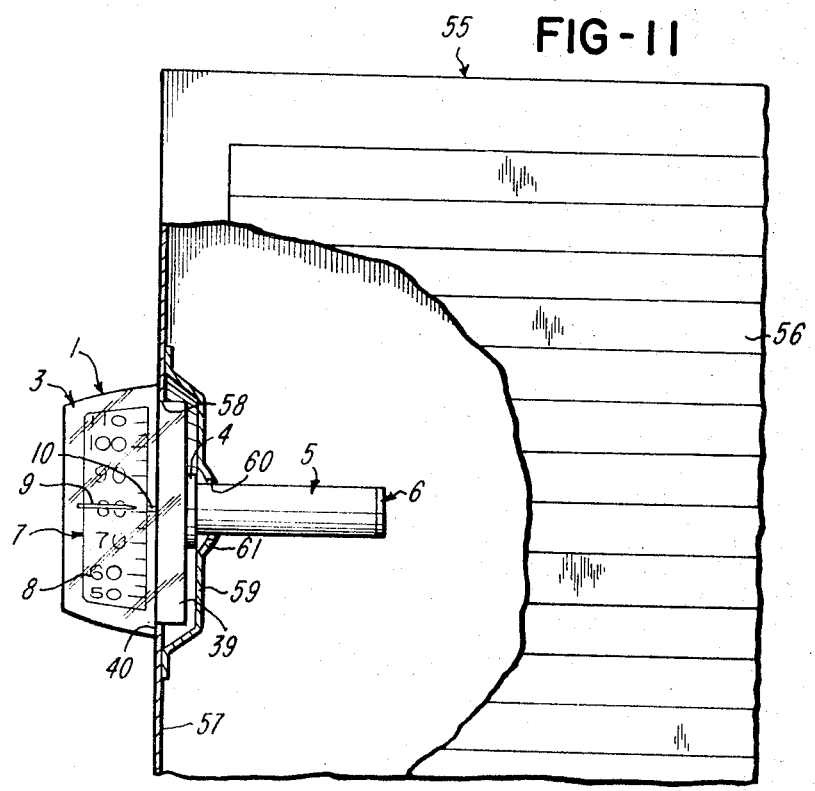

THERMOMETER

BACKGROUND OF THE INVENTION

1. Field of the Invention

The invention relates to a thermometer, and more particularly to a thermometer which may be permanently or removably plugged into an appropriate opening in a housing, enclosure, duct, conduit or the like to give an accurate reading of the temperature of the atmosphere or other medium therein.

2. Description of the Prior Art

Heretofore prior art workers have developed a number of different types of bimetallic temperature indicating devices. Such devices have been relatively complex in nature, difficult to assemble and expensive to manufacture.

The prior art bimetallic temperature measuring devices have generally been delicate, their efficiency and accuracy being severely diminished by harsh environment, vibration or the like. Furthermore, they generally constitute single purpose units, being intended for specific uses or particular installations.

The present invention is directed to a bimetallic thermometer which is simple in construction, easy to assemble and inexpensive to manufacture. Despite its simplicity, the centered shaft and balanced indicator drum of the device of the present invention result in excellent accuracy characteristics. All of the parts are enclosed and protected so that, as will be disclosed hereinafter, the thermometer will withstand the elements, vibration and the like without losing its excellent accuracy characteristics.

The thermometer of the present invention has substantially unlimited uses, exemplary ones of which will be described hereinafter. It is so constructed that it may be plugged into an appropriate opening in a housing, enclosure, duct, conduit or the like to give accurate readings of the temperature of the medium or atmosphere therein. Its installation may be permanent or removable, so that the same thermometer may be used for a number of different purposes. Finally, the orientation of the thermometer does not affect its accuracy.

SUMMARY OF THE INVENTION

The thermometer of the present invention comprises an elongated shaft, one end of which is affixed to an indicator drum. The indicator drum is of circular configuration, balanced, and has a peripheral skirt upon which a temperature scale is marked.

The shaft and drum are enclosed in a housing having an enlarged portion for the drum and an elongated portion for the shaft. The elongated portion of the housing contains appropriate bearing means enabling both rotation of and axial movement of the shaft. A helical bimetallic element surrounds the shaft in the elongated housing portion. The bimetallic element is affixed at one end to the elongated housing portion and at its other end to the shaft.

The enlarged portion of the thermometer housing is such that a part at least of the temperature scale on the drum skirt can be viewed therethrough. A reference line is provided in association with the enlarged housing portion. The reference line, in cooperation with the temperature scale on the drum, yields a temperature reading.

The thermometer is so calibrated that the temperature of the atmosphere or medium surrounding the elongated housing portion will, through the action of the helical bimetallic element, result in a rotation of the shaft and the indicator drum mounted thereon until that indicia on the temperature scale, corresponding to the temperature of the medium, is in alignment with the reference line.

The enlarged housing portion is so configured that it may be engaged in an appropriate perforation in a housing, duct or the like so that the elongated housing portion of the thermometer will extend therein and be surrounded by the medium therein. As a consequence, a temperature reading of the medium can be obtained. The enlarged portion of the thermometer housing may be permanently or removably affixed in the above mentioned perforation so that the thermometer is of the plug-in type.

The thermometer housing about the shaft, bimetallic element and indicator drum is such that it may be readily and inexpensively assembled and sealed. This will prevent a loss of accuracy due to an accumulation of dirt or foreign material. It is also within the scope of the present invention to hermetically seal the thermometer housing or to provide a special atmosphere therein to prevent fogging (through condensation) and corrosion.

BRIEF DESCRIPTION OF THE DRAWINGS

FIG. 7 is a plan view of the indicator drum.

FIG. 8 is a cross sectional view taken along the section line 8—8 of FIG. 7.

FIG. 9 is a cross sectional view of the thermometer crystal.

FIG. 10 is a side elevational view, partly in cross section, illustrating the thermometer of the present invention, mounted in a housing to be affixed to the exterior of a vehicle or the like.

FIG. 11 is a fragmentary elevational view, partly in cross section, illustrating the mounting of the thermometer of the present invention in the cold air discharge of an air conditioner casing.

DESCRIPTION OF THE PREFERRED EMBODIMENTS

Figure 1:
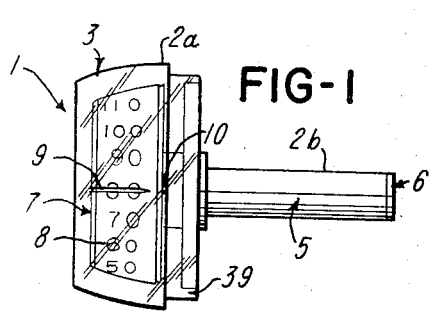
FIG. 1 is a side elevational view of the thermometer of the present invention.
Figure 2:
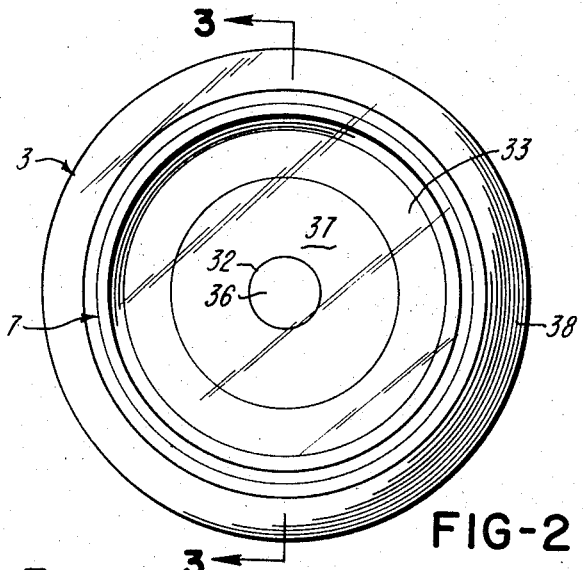
FIG. 2 is an end elevational view of the thermometer of FIG. 1 as seen from the left thereof.

The finished thermometer of the present invention is illustrated in FIGS. 1 and 2. The thermometer is generally indicated by index numeral 1 and comprises a housing having an enlarged portion 2a and an elongated portion 2b. In the exemplary embodiment illustrated, the enlarged portion 2a is shown as comprising a cup-shaped clear plastic crystal 3, the open end of which is closed by a back disc member 4. The elongated body portion 2b comprises a cylindrical stem 5 and an end closure plug 6.

Within the crystal 3 there is an indicator drum 7 having a temperature scale 8 marked about its periphery. To cooperate with the temperature scale the crystal 3 has marked thereon a reference line 9. Finally, the indicator drum 7 is mounted on a shaft 10 which, as will be explained hereinafter, is rotatably supported in the stem 5.

Figure 3:
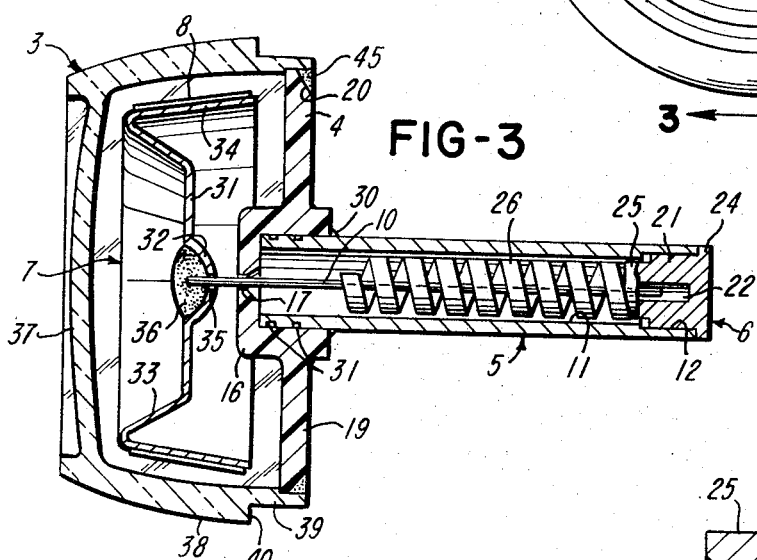
FIG. 3 is a cross sectional view taken along the section line 3—3 of FIG. 2.
Figure 4:
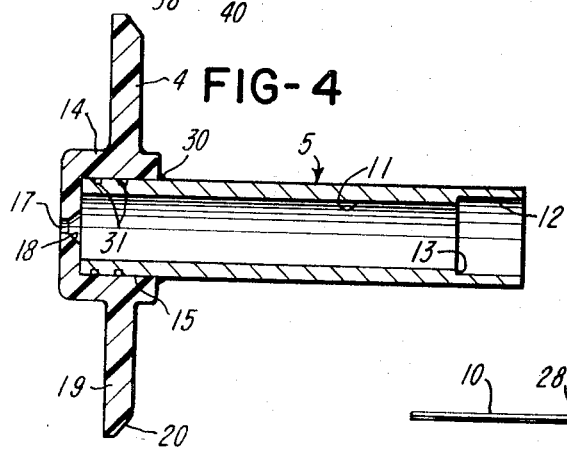
FIG. 4 is a cross sectional elevational view of the assembly of the stem and back of the present invention.

For a more detailed description of the thermometer structure, reference is first made to FIGS. 3 and 4. The stem 5 comprises a hollow cylindrical member open at both ends and having a central longitudinal bore 11. At the rearward end of the stem a slightly enlarged bore 12 is provided, a shoulder 13 being formed between the bores 11 and 12. The stem 5 may be made of any suitable temperature-conductive, stable material which will be otherwise unaffected by the medium in which it is located. While the thermometer of the present invention may be used to measure the temperature of many mediums, for purposes of an exemplary showing it will be described hereinafter in its use as a means to measure the temperature of the atmosphere. Under these circumstances, aluminum has been found to be an excellent, easily workable material from which to form the stem 5.

FIG. 4 also illustrates the back 4. While again the back 4 may be made of any appropriate material, it is shown as a molded plastic element. The back 4 comprises a hollow cylindrical body portion 14 having a central bore 15. The forward end of the body portion 14 is provided with an end wall 16 having a small, central, cylindrical bore 17 therethrough. The bore 17 flares rearwardly and outwardly as at 18 into the central bore 15. The bore 17, as will be described hereinafter, serves as one bearing for the shaft 10. Finally, the back 4 has an integral circular flange 19, the peripheral edge of which is relieved as at 20. The purpose of the relief 20 will be described hereinafter.

Figure 5:
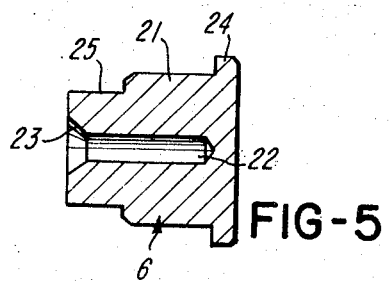
FIG. 5 is a cross sectional elevational view of the end plug of the stem.

Referring to FIGS. 3 and 5, the plug 6 for stem 5 is shown in FIG. 5. The end plug comprises a cylindrical body portion 21 having a central bore 22 which flares forwardly and outwardly at the forward end of the plug, as at 23 and is closed at its rear end. As will be described, the bore 22 serves to provide for the other bearing for the shaft 10.

At the rearwardmost end of the body 21 of plug 6 there is an annular flange 24. At the forwardmost end of the body there is a portion 25 of reduced diameter. Again, the plug 6 may be made of any suitable material. In the exemplary embodiment described, stainless steel was found to serve the purpose well.

Figure 6:
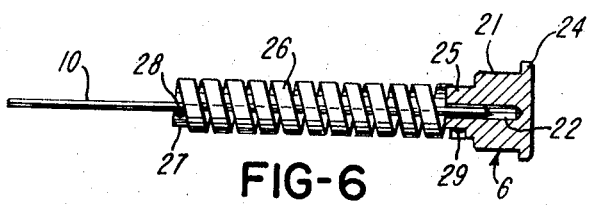
FIG. 6 is an elevational view, partly in cross section, illustrating the assembly of the shaft, the bimetal element and the end plug.

Reference is now made to FIGS. 3 and 6. FIG. 6 illustrates the assembly of the shaft 10, plug 6 and a helical bimetallic member 26.

In order to achieve the proper and balanced operation of the thermometer of the present invention, it is important that the shaft 10 be straight. It is similarly important that the shaft be made of a material which not only can be accurately straightened, but also which can maintain its straightness without sagging, bending or the like. To this end, the shaft 10 is preferably made of stainless steel wire of appropriate gauge, depending upon the size of the unit being produced.

As is evident from FIGS. 3 and 6, the shaft 10 extends axially of the helical bimetal element 26 and is surrounded thereby. At its forwardmost end, the bimetal element 26 is bent radially inwardly (as at 27) and welded to the shaft 10 at 28. The rearwardmost end of bimetal element 26 extends about the reduced diameter portion 25 of end plug 6 and is spot welded thereto as at 29.

As is evident from FIG. 3, the assembly shown in FIG. 6 is inserted in the rear end of stem 5. The bore 12 of stem 5 and the body portion 21 of the end plug are so sized with respect to each other as to form a good fit. The fit between these elements may be a frictional fit, or an appropriate adhesive or the like may be used.

As is shown in FIGS. 3 and 4, the forward end of the stem 5 is inserted in the central bore 15 of the back 4. These members are held in assembly by any appropriate means including an epoxy adhesive 30 or the like. Again, the bore 15 of the back 4 may be so sized with respect to the stem that they are also frictionally engaged. The stem, in addition, may be provided with one or more annular grooves 31 to receive sealing means, epoxy adhesive or the like.

It will be evident from FIG. 3 that the perforation 17 in the back 4 serves as a forward bearing for the shaft 10. Similarly, the bore 22 in the plug 6 serves as a rearward bearing for the shaft. The shaft is therefore freely rotatable within the stem 5. It will be noted that the longitudinal bore 11 of the stem 5 is so sized with respect to the bimetal element 26 that changes in diameter of the bimetal element due to temperature changes can be accommodated. The radially bent forward end 27 of the bimetal element will assure that the shaft 10 will remain centered with respect to the bimetal element.

It will be understood that the bimetal element 26 will coil or uncoil slightly in reaction to the temperature of the medium to which the stem 5 is exposed. This will cause a slight change in diameter of the bimetal element as well as a lengthening or shortening thereof. This action of the bimetal element will cause rotation of the shaft 10 and a slight attendant axial shift thereof. The bore 22 in the plug 6 is of a length such that it will accommodate the slight axial shift of the shaft 10.

The indicator drum 7 is illustrated in FIGS. 7 and 8. The indicator drum is accurately formed of aluminum or the like so as to be a balanced unit. The indicator drum comprises a circular disc-like portion 31 having a central depression 32. At the periphery of the disc-like portion 31 the drum flares forwardly and outwardly as at 33 and terminates in a rearwardly and outwardly flaring skirt 34. The skirt 34 carries about its circumference a temperature scale 8 (see FIG. 1). This temperature scale may be marked on the skirt 34 in any suitable manner. As illustrated in the Figures, the temperature scale 8 comprises a pressure sensitive decal.

The indicator drum 7 may be affixed to the forward end of shaft 10 by any suitable means, so long as that means does not unbalance the assembly. One excellent method of joining the shaft 10 to the drum 7 is illustrated in FIG. 3. The forwardmost end of the shaft 10 is inserted through an opening or perforation 35 formed centrally of the drum 7 in the depression 32. The depression is then filled with a bead of epoxy or other appropriate adhesive 36. The depression 32 serves as a cup-like structure assuring that the epoxy 36 will set up in a uniform bead, thereby maintaining the balance of the unit.

The structure of the present invention is completed by the crystal 3, shown most clearly in FIGS. 3 and 9. While it would be within the scope of the present invention to make the cap-like crystal of any appropriate opaque material provided with a window through which the indicator drum could be viewed, excellent results have been achieved when the entire crystal structure comprises a molded, clear acrylic member which is easy and inexpensive to manufacture.

The precise configuration of the crystal 3 does not constitute a limitation on the present invention. For purposes of an exemplary illustration, it is shown as having a slightly curved, depressed forward wall 37 and an annular, slightly curved, rearwardly, outwardly flaring wall 38. The interior of the crystal 3 is so sized as to permit free rotation of the drum 7 therein and a slight axial shifting of the drum.

At its open, rearward end the crystal 3 is provided with a rearwardly extending, annular skirt 39. The exterior surface of skirt 39 forms an annular shoulder 40 with the wall 38. The interior surface of the skirt 39 has a portion of slightly greater diameter than the interior surface of the wall 38 forming an annular notch 41 and an annular shoulder 42. When desired, the annular surface of notch 41 may be provided with a rearward and outward draft of about 2° as at 43 and the exterior portion of the same part of the skirt 39 may be given a rearward and inward draft of about 2°, as at 44.

As is shown in FIG. 3, the circular flange 19 of the back 4 is so sized as to be received in the crystal notch 41 and abuts the shoulder 42 on the crystal. A frictional engagement may be provided. The crystal 3 may be retained and sealed on the back 4 by an annular bead of adhesive material located between the crystal skirt 39 and the annular relieved surface 20 of the back 4.

It will be evident from the above description that the assembly of the thermometer of the present invention may be accomplished easily and inexpensively. When the occasion requires, the crystal 3, back 4, stem 5 and end plug 6 may be joined together in a sealed fashion. It is within the scope of the invention to provide the interior of the assembly with a protective atmosphere or to hermetically seal it to prevent corrosion of the parts and fogging of the crystal 3 through condensation.

The operation of the device may be described as follows. When the stem 5 is located in the medium, the temperature of which is to be measured, the bimetal element 26 will react to the surrounding temperature imparting rotation in an appropriate direction to the shaft 10 and the indicator drum 7. The device will be calibrated such that the temperature scale 8 will cooperate with the reference line 9 formed on the crystal 3 to give an accurate indication of the temperature of the medium.

FIG. 10 illustrates an exemplary use for the thermometer of the present invention. With respect to the thermometer itself, like parts have been given like index numerals. In FIG. 10, the thermometer unit 1 is illustrated as being mounted in a housing (generally indicated at 46) mounted on an appropriate exterior surface of a vehicle or the like (not shown) such as an automobile. The housing 46 has a base 47 which may be affixed in any appropriate manner to the exterior surface of the vehicle. The housing has a forward end 48 facing in the normal direction of travel of the vehicle and a rearward end 49. The housing has a central bore 50 which extends from the forward end 48 to the rearward end 49. At the rearward end of the housing, the bore 50 terminates in a circular opening 51 with an annular shoulder 52. The circular opening 51 is adapted to receive the skirt 39 of the crystal 3, with the shoulder 40 of the crystal abutting the housing end 49. The forwardmost end of the skirt 39 may also abut the housing shoulder 52.

The thermometer unit 1 may be held in place in the circular opening 51 by a frictional fit. Other expedients, however, may be used, such as adhesive or mechanical means including a set screw or the like (not shown). Finally, the central bore 50 has a lateral passage 53 forming an opening 54 in the rearward end 49 of the housing.

When the vehicle is in use, air will be caused to enter the housing bore 50, as indicated by the arrows. The air will pass about the stem 5 of the thermometer unit and will exit the housing through the lateral passage 53 and opening 54 therein. The thermometer unit 1 will give a reading for the surrounding air passing through the housing 46. From its construction previously described, it will be evident that the thermometer unit 1 will be unaffected by the elements and is sufficiently simple and rugged to withstand vibration imparted to it by the moving vehicle.

FIG. 11 illustrates another exemplary use of the unit of the present invention. Again the unit is generally indicated by the index numeral 1 and like parts have been given like index numerals.

In this instance, the thermometer unit 1 is shown as mounted in the cold air discharge portion of a window air conditioning unit. The air conditioner cabinet is generally indicated at 55 and has, on its forward face, cold air discharge louvers 56. The side 57 of the air conditioner cabinet is illustrated as having a circular perforation 58 therein. On the inside surface of the cabinet side 57 there is welded or otherwise affixed an annular dish-like member 59 having a central hole 60 therein. The perforation 58 in the cabinet side 57 is so sized as to just nicely receive the skirt 39 of the thermometer unit crystal 3, the shoulder 40 of the crystal abutting the exterior surface of the cabinet side. The hole 60 in the element 59 is so sized as to just nicely receive the thermometer unit stem 5. The thermometer unit may be held in place by any suitable means. For purposes of an exemplary illustration, a spring clip 61, of well known construction, is illustrated as being welded or otherwise affixed to the member 59, frictionally engaging the stem 5 of the thermometer unit. In this way, a simple and inexpensive means is provided to determine the temperature of the cold air being discharged by the air conditioning unit.

The uses of the thermometer unit of the present invention described above are exemplary only. It will be understood that the unit may have many other uses and may be permanently or removably mounted in a cabinet, housing, duct or the like. In this way, a permanent, inexpensive temperature indicating device may be provided. On the other hand, by virtue of its plug-in construction, the thermometer unit may be removably mounted so that the same unit may be used to make temperature determinations of the mediums in numerous housings, conduits, ducts or the like.

Modifications may be made in the invention without departing from the spirit of it. For example, it would be within the scope of the invention to locate the reference line 9 on the indicator drum skirt 34 and the temperature scale on the circular wall 38 of the crystal 3.

The embodiments of the invention in which an exclusive property or privilege is claimed are defined as follows:

1. A plug-in thermometer comprising an elongated shaft, an indicator drum fixed to one end of said shaft, an elongated tubular stem housing the opposite end of said shaft, plug means closing said stem at the end thereof remote from said drum, the opposite end of said stem being fixed in a socket formed by a hollow cylindrical body portion in a transversely disposed disc member, a forward end of said body portion having a small central cylindrical bore therein providing an aperture through which said shaft extends to connect to said drum, a cup-like cover member for said drum, said one end of said shaft terminating within said cover member, said disc member being fixed within the open end of said cover member to enclose said drum and provide a bearing means for said shaft; said cup-like member, said disc member, said stem and said plug means being interconnected to provide a sealed enclosure for said drum and said shaft, a bimetallic element mounted within said stem to have one end thereof in connection with said enclosure and its other end in connection with said shaft, said shaft being mounted in a bearing relation to said plug means and said disc member for a balanced rotative movement and axial shift thereof under the influence of said bimetallic element in correspondence with changes in the temperature of its environment, and a temperature scale applied to the periphery of one of said indicator drum and said cup-like cover member and a cooperating indicator applied to the other to provide for a precise readout of the temperature of the environment to which the thermometer is applied.

2. The structure claimed in claim 1 wherein said cover member comprises an integral, one-piece member molded of clear plastic.

3. The structure claimed in claim 1 wherein said temperature scale is carried about the periphery of said indicator drum, said reference line being located on an annular side wall of said cover member.

4. The structure claimed in claim 1 wherein said cover member, said disc member, said stem and said plug means are joined together in air-tight fashion.

5. The structure claimed in claim 1 adapted for insertion in an aperture in the wall of a housing, duct, conduit and the like to measure the temperature of the medium therein, wherein the open end of said cover member is formed with an exterior annular shoulder, and said aperture is so sized as to pass said thermometer until said exterior shoulder comes into abutment with the wall surface about said aperture.

* * * * *